UNITED STATES PATENT OFFICE.

AUGUST BLANK, CARL HEIDENREICH, AND JOHANNES JANSEN, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

COTTON-DYESTUFFS.

1,082,924.  Specification of Letters Patent.  Patented Dec. 30, 1913.

No Drawing.  Application filed March 28, 1913.  Serial No. 757,369.

*To all whom it may concern:*

Be it known that we, AUGUST BLANK, CARL HEIDENREICH, and JOHANNES JANSEN, doctors of philosophy, chemists, citizens of the German Empire, residing at Leverkusen, near Cologne-on-the-Rhine, Germany, have invented new and useful Improvements in Cotton-Dyestuffs, of which the following is a specification.

We have found that new and valuable cotton dyes can be obtained by combining with an azo component, such as resorcin, meta-diamins, meta-aminophenol or their derivatives, the diazo compounds obtainable from diaminodibenzoyldiaminostilben-disulfonic acid of the formula:

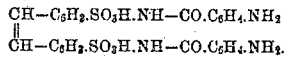

The new products are after being dried and pulverized in the shape of their alkaline salts yellow to brown powders soluble in water generally with a yellowish coloration and yielding upon reduction with stannous chlorid and hydrochloric acid diaminodibenzoyldiaminostilben-disulfonic acid and an amin. They dye cotton yellow to orange-red shades. These colors are rendered very fast to washing by after-treatment with formaldehyde of fibers dyed with them.

In order to illustrate the new process more fully the following example is given, the parts being by weight:—47.3 parts of meta-meta-diaminodibenzoyldiaminostilben-disulfonic acid (sodium salt) are dissolved in 300 parts of hot water, the solution is cooled with ice to 10° C. and diazotized with 50 parts of hydrochloric acid and 10 parts of sodium nitrite. The diazotation is finished after stirring for 2-3 hours and the diazo-compound is added to a cooled solution of 16 parts of resorcin in 700 parts of water containing 40 parts of $Na_2CO_3$. After some time the mixture is heated to 70° C. and the azo dye is salted out. It is after being dried and pulverized in the shape of its sodium salt a yellow powder soluble in water with a yellow coloration; in caustic soda lye with an orange-yellow coloration; and being soluble in concentrated sulfuric acid of 66° Bé. with a yellowish coloration. It has in a free state most probably the formula:

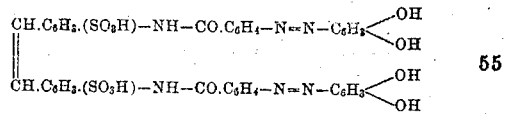

Upon reduction with stannous chlorid and hydrochloric acid meta-meta-diaminodibenzoyldiaminostilben-disulfonic acid and aminoresorcin are obtained. It dyes cotton in bright yellow shades, which are rendered fast to washing by treatment with formaldehyde.

Similar dyes are obtained from para-para-diaminodibenzoylstilben-disulfonic acid or on using instead of resorcin meta-phenylenediamin or meta-aminophenol, etc.

Other of the above mentioned products can be used.

We claim:—

1. The herein described new azo dyestuffs being azo-dyes obtained from diaminodibenzoyldiaminostilben-disulfonic acid, which are after being dried and pulverized in the shape of their alkalin salts yellowish to brownish powders soluble in water generally with a yellowish coloration and yielding upon reduction with stannous chlorid and hydrochloric acid diaminodibenzoyldiaminostilben-disulfonic acid and an amin; dyeing cotton yellow to orange-red shades which are rendered fast to washing by an after-treatment with formaldehyde.

2. The herein described new azo dyestuff which has in a free state most probably the formula:

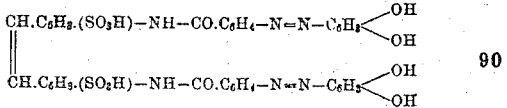

which is after being dried and pulverized in the shape of its sodium salt a yellow powder soluble in water with a yellow coloration; in caustic soda lye with an orange-yellow coloration; being soluble in concentrated sulfuric acid of 66° Bé. with a yellowish coloration; and yielding upon reduction with stannous chlorid and hydrochloric acid meta-meta-diaminodibenzoyldiaminostilbendisulfonic acid and amino-resorcin; dyeing cotton in bright yellow shades, fast to washing by an after-treatment with formaldehyde, substantially as described.

In testimony whereof we have hereunto set our hands in the presence of two subscribing witnesses.

AUGUST BLANK. [L. S.]
CARL HEIDENREICH. [L. S.]
JOHANNES JANSEN. [L. S.]

Witnesses:
 HELEN NUFER,
 ALBERT NUFER.